J. N. Clarke,
Horseshoe.

No. 56,181. Patented July 10, 1866.

Witnesses:
Inventor:

UNITED STATES PATENT OFFICE.

JOHN N. CLARKE, OF CINCINNATI, OHIO.

IMPROVEMENT IN HORSESHOES.

Specification forming part of Letters Patent No. 56,181, dated July 10, 1866.

*To all whom it may concern:*

Be it known that I, JOHN N. CLARKE, of Cincinnati, Hamilton county, Ohio, have invented a new and useful Improvement in Horseshoes; and I do hereby declare the following to be a full, clear, and exact description thereof, reference being had to the accompanying drawings, making part of this specification.

My invention consists in forming the sole or under side of a horseshoe with alternate transverse ridges and indentations which extend entirely across the width of the shoe and by their diverse directions effectually oppose the slipping of the animal's foot upon the ground or pavement.

Figure 1:
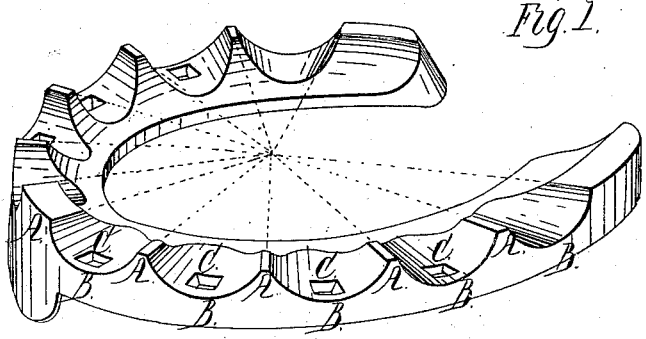
Figure 2:
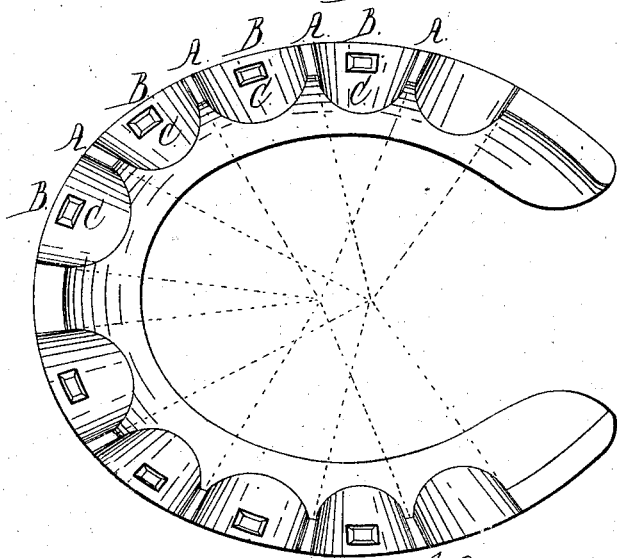

Figure 1 is a perspective view of the under side of my improved shoe. Fig. 2 is a face view of the under side of a modification of my shoe.

Instead of making my horseshoe flat upon the under side, and with concentric or longitudinal grooves or fullers where the nail-holes occur, or, if roughened, with a toe and two calks merely, I form the entire sole into alternate transverse ridges A and hollows or valleys B, which hollows are of equal depth from side to side, and are traversed by nail-holes of countersunk form at their crowns or central parts. I form every two consecutive ridges oblique with respect to each other and to those on either side of them, so as to oppose any slippage in whatever direction it may take place. This may be effected by causing all the ridges to radiate from a common center, as in Fig. 1, or from several centers, as in Fig. 2.

C are countersunk nail-holes formed at or near the crowns or central portions of the hollows.

A shoe thus formed, while always adequately roughened or calked for the most slippery situations, is not so liable to strain the animal's foot as is the case with the common mode of calking, where, upon irregular ground, the shoe will sometimes strike by one or two points only and be wholly unsupported at its other parts.

Another very decided advantage of my transverse indentations over those which follow the curve or contour of the shoe is that they are not liable to become choked up with dirt. The nails, occupying countersunk holes at the middle of the hollows, are entirely protected from wear. The valleys occuring at frequent and equidistant intervals, the shoe is easily bent by the farrier to suit the hoof of the horse without assuming an angular or polygonal form. It is found that the striking of such a shoe upon a hard flat surface in the act of rapid traveling does not jar the animal to the extent that a smooth shoe does, while from the more numerous points of contact of my shoe, as compared with the common calked article, the liability to side strain is avoided.

The ridges very effectually protect the nail-heads from wearing, and by their numerous diverse angles serve to check in every direction the tendency to slippage.

I am aware that the under side of horseshoes has been proposed to be formed with a longitudinal ridge or ridges parallel to or following the general curve or contour of the shoe, and therefore make no claim to such; but

I claim herein as new and of my invention—

Forming the sole of a horseshoe substantially as described and shown—that is to say, with transverse and diverging ridges A, alternating with hollows B, which are pierced at or near their crowns with the nail-holes C.

In testimony of which invention I hereunto set my hand.

JNO. N. CLARKE.

Witnesses:
 GEO. H. KNIGHT,
 JAMES H. LAYMAN.